Sept. 8, 1953

H. W. JESPERSEN 2,651,102

BROACHING TOOL

Filed June 8, 1949

INVENTOR
H. W. JESPERSEN
BY
ATTORNEY

Patented Sept. 8, 1953

2,651,102

UNITED STATES PATENT OFFICE 2,651,102

BROACHING TOOL

Helgo W. Jespersen, Western Springs, Ill., assignor to Western Electric Company, Incorporated, New York, N. Y., a corporation of New York Application June 8, 1949, Serial No. 97,827

5 Claims. (Cl. 29—95.1)

This invention relates to a broaching tool and to a method of making the same.

In the manufacture of certain articles such, for example, as the magnet structures of electrical measuring instruments, a high degree of precision is required and, accordingly, difficulties are encountered in forming cooperating surfaces of the magnet structures which define the air gap of the completed instruments. Numerous broaches have been designed for broaching meter magnet assemblies and Patent 2,394,723 issued to S. J. Snorek discloses one type of broach which can be used for broaching meter magnets. The broach disclosed by Snorek as well as most other broaches which are adapted to broach two or more concentric surfaces are of two-part construction, and although such broaches have proved satisfactory it is evident that a broach of unitary structure would be advantageous from a manufacturing standpoint.

In cases where a one-part broach is used it is necessary in order to produce two concentric surfaces to grind away a part of the cutting surfaces of the broach. It has heretofore been the practice to remove these surfaces by grinding or milling in the direction of the axis of the broach while at the same time rotating the broach back and forth on its axis through an angle substantially equal to the arc it was desired to grind. Such a procedure has proved to be inaccurate primarily due to the fact that any grinding surface will wear slightly between the time the grinding operation starts at one side of the arc and the time the grinding has progressed, by the rotation of the broach on its axis, to the other extreme of the arc. Consequently, the ground surface, which in most cases serves as a guide surface, is not absolutely concentric with the remaining cutting or broaching surface.

It is an object of this invention to provide a new and improved broach for broaching concentric surfaces.

In accordance with one embodiment of the invention, a broach is provided wherein a plurality of groups of concentric cutting or broaching surfaces of varying sizes are formed on a piece of stock by the use of a turning lathe. By using a turning lathe, absolute concentricity of all of the cutting surfaces is insured. With a tool body thus formed a part of the arcs of the larger cutting surfaces are then removed to render the corresponding arcs of smaller cutting surfaces in the groups effective without performing any grinding or cutting operation that will affect any cutting or guiding surface which might jeopardize the concentricity of the broaching surfaces. Such a broach is provided in this invention by turning concentric cutting surfaces on a lathe and then milling or grinding through the larger of the cutting surfaces in a direction transverse to the axis of the broach to leave exposed the cutting edges of the smaller diameter. Thus, no portion of the broach that will ultimately come in contact with the material being broached is affected by the grinding or milling operation.

A more complete understanding of the invention may be had by referring to the following description when read in conjunction with the accompanying drawing wherein.

Figure 1:
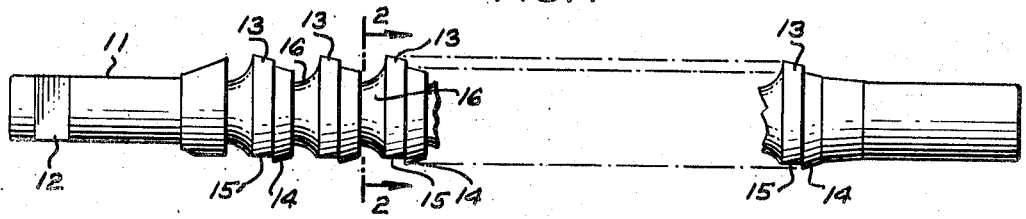
Fig. 1 is a side elevation of one type of broach embodying the principles of the invention.
Figure 2:
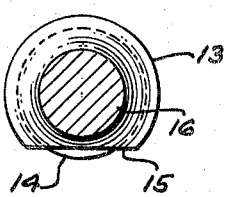
Fig. 2 is a cross-sectional view taken along line 2—2 of Fig. 1.

Referring now to Figs. 1 and 2, the broaching tool comprises a shaft portion 11 having a notch 12 therein for attaching the broach to any suitable broach operating mechanism. Intermediate its ends the broach has a series of groups of teeth 13, 14 cut in it by means of a turning lathe, and initially these teeth extend completely around the circumference of the tool. The tooth 13 of each group is turned to a larger diameter than the next succeeding tooth 14 of each group; therefore it is obvious that only the teeth 13 would be effective unless portions of the teeth 13 were removed. In order to broach two concentric surfaces the necessary portions of the arcs of teeth 13 are milled or ground away by passing the broach over a milling or grinding machine, the milling or grinding being carried out in a direction normal to the axis of the broach. Such an operation results in the removal of the desired portion of the cutting tooth 13 to render the corresponding arcuate cutting surface of the tooth 14 effective. The particular ground or milled surface which is indicated at 15 may be of any suitable depth depending on the length of the arcs it is desired to broach, and it is obvious that whereas a milling machine will give a straight cut at 15, a rotary grinding wheel which gives an arcuate shaped cut by merely moving the grinding wheel toward the center of the broach without moving the broach transversely with respect to the grinding surface would provide an equally satisfactory broach.

It is also desirable when turning the teeth of the broach to provide annular recessed portions 16, which portions serve to receive the chips removed during the broaching operation.

Figure 3:
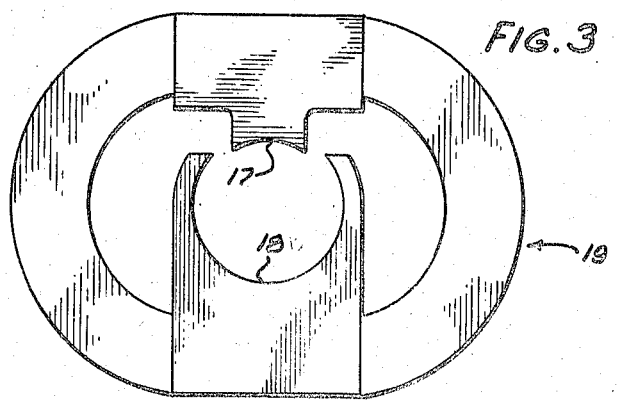
Fig. 3 is an elevational view of a magnet structure which may be formed by the broach of Figs. 1 and 2.

A broach such as shown in Figs. 1 and 2 may be used to broach two concentric surfaces, such for example as the two arcuate surfaces 17 and 18 of a meter magnet structure 19 shown in Fig. 3. The larger arcuate segment 18 in this case is formed by the broaching action of the teeth 13, and the smaller segment 17 is formed by the teeth 14.

Although the invention has been illustrated and described in conjunction with a broach having groups of teeth arranged in pairs, it is obvious that any number of teeth could be provided in each group. In this case it would be necessary to have each subsequent tooth in each group of a smaller diameter than the preceding tooth, and each desired arcuate portion would be made effective for broaching by milling away the corresponding arcs of all of the larger teeth in the group. In this manner a plurality of concentric arcs may be broached simultaneously.

It is also pointed out that although all of the teeth have been described and illustrated as cutting teeth, it is entirely possible to provide burnishing or guiding surfaces in place of some of the cutting teeth under certain conditions. For example, during the final few thousandths of an inch of the broaching operation of a meter magnet it has been found desirable to use the larger arc of the magnet as a guide for the final broaching of the smaller arc, in which case teeth 13 are replaced by appropriate non-cutting guiding surfaces on a part of the broach to guide the teeth 14 in their final cuts.

It is further pointed out that the teeth in each group need not be flush, as illustrated here, but may be spaced from each other along the axis of the broach. It has been found that in broaching two or more concentric surfaces simultaneously there is a tendency for the object being broached to "walk" or become misaligned if it is not supported by at least two or three teeth of the broach at all times; thus it will usually be found necessary, particularly in the broaching of objects of small thickness, to turn at least a part of the teeth flush in order to provide the requisite support for the reasons explained above.

Although all of the corresponding teeth in the drawing have been shown as being of the same diameter, it is to be understood that the teeth are actually larger at the right end of the broach (Fig. 1) since, as in the case of all broaches, a slight taper is present, increasing from left to right (Fig. 1).

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The method of making a broach which comprises turning a plurality of pairs of cutting surfaces on a piece of stock, the diameter of the first of each pair of surfaces being larger than the diameter of the second of each pair of surfaces, and milling away a portion of the arc of the first of each pair of cutting surfaces thereby to render the corresponding portion of the arc of the second of each pair of cutting surfaces effective for broaching.

2. The method of making a broach from a piece of stock which includes turning a plurality of pairs of cutting surfaces on said stock, and removing by a grinding cut transverse to the axis of the stock a portion of the cutting surface of one of each pair of cutting surfaces thereby to render the corresponding portion of the other cutting surface of each pair effective for broaching.

3. The method of making a broach from a piece of stock which includes turning a plurality of pairs of cutting surfaces on said stock, the diameter of the first of each pair of surfaces being larger than the diameter of the second of each pair of surfaces, and milling away by a cut transverse to the axis of the stock a segment of the cutting edge of the first of each pair of cutting surfaces thereby rendering the corresponding segment of the second of each pair of cutting surfaces effective for broaching.

4. The method of making a broach from a piece of stock which includes turning a plurality of groups of stepped cutting surfaces on said stock, the diameters of the stepped surfaces of each group being progressively smaller, and milling away by cuts transverse to the axis of the broach segments of the cutting surfaces thereby to render the corresponding segments of the next smaller unmilled cutting surfaces effective for broaching.

5. A broach comprising an elongated integral member having along its length a series of pairs of frusto-conical cutters, a first cutter of each pair having a predetermined larger diameter and a second cutter of each pair having its end of smaller diameter adjacent to the large end of the first cutter and larger than said larger end, each of said second-mentioned cutters being relieved on one side thereof sufficiently that a portion of the larger end of the first-mentioned cutter projects beyond the relieved portion.

HELGO W. JESPERSEN.

References Cited in the file of this patent

UNITED STATES PATENTS

| Number | Name | Date |
|---|---|---|
| 2,049,491 | Drader et al. | Aug. 4, 1936 |
| 2,120,041 | Praeg | June 7, 1938 |
| 2,394,723 | Snorek | Feb. 12, 1946 |
| 2,398,310 | Howell | Aug. 9, 1946 |